(12) United States Patent
Liu et al.

(10) Patent No.: US 9,252,893 B2
(45) Date of Patent: Feb. 2, 2016

(54) METHODS FOR DETERMINING A BEAM-FORMING GAIN PARAMETER, USER EQUIPMENT, BASE STATION, COMPUTER PROGRAMS AND COMPUTER PROGRAM PRODUCTS

(75) Inventors: Weihong Liu, Beijing (CN); Jia Hu, Beijing (CN); Licong Huang, Beijing (CN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 14/369,372

(22) PCT Filed: Dec. 28, 2011

(86) PCT No.: PCT/CN2011/084811
§ 371 (c)(1),
(2), (4) Date: Jun. 27, 2014

(87) PCT Pub. No.: WO2013/097111
PCT Pub. Date: Jul. 4, 2013

(65) Prior Publication Data
US 2015/0010112 A1    Jan. 8, 2015

(51) Int. Cl.
*H04B 7/02* (2006.01)
*H04L 1/02* (2006.01)
*H04B 17/00* (2015.01)
*H04W 24/08* (2009.01)
*H04B 7/06* (2006.01)
*H04B 17/309* (2015.01)
*H04B 17/318* (2015.01)

(52) U.S. Cl.
CPC .......... *H04B 17/0042* (2013.01); *H04B 7/0617* (2013.01); *H04B 17/309* (2015.01); *H04W 24/08* (2013.01); *H04B 17/318* (2015.01)

(58) Field of Classification Search
CPC ...... H04L 1/0618; H04L 1/06; H04L 27/2647; H04L 5/0007; H04B 7/0417; H04B 7/0669; H04B 7/0845; H04W 28/04; H04W 72/04
See application file for complete search history.

(56) References Cited

U.S. PATENT DOCUMENTS

2008/0031387 A1    2/2008  Shin et al.
2010/0273499 A1*  10/2010  van Rensburg ... H04W 72/1231
                                                              455/450

(Continued)

FOREIGN PATENT DOCUMENTS

CN    101527964 A    9/2009
CN    101741445 A    6/2010
CN    101902298 A    12/2010

OTHER PUBLICATIONS

Unknown, Author, "Physical Layer Design Considerations for CLTD", QUALCOMM Incorporated, 3GPP TSG RAN WG1 Meeting #63bis, R1-110118, Dublin, Ireland, Jan. 17-21, 2011, 1-8.

(Continued)

*Primary Examiner* — Ted Wang
(74) *Attorney, Agent, or Firm* — Patent Portfolio Builders, PLLC (57) ABSTRACT

The invention relates to a method 10 performed in a user equipment 3, 4 of a communication system 1 for determining a beam-forming gain parameter, the communication system 1 comprising a base station 2 serving the user equipment 3, 4. The method 10 comprises: receiving 1 a cell-specific reference signal and a dedicated reference signal from the base station 2; measuring 12 a received power, $P_{RSRP}$, of the cell-specific reference signal and a received power, $P_{DRSRP}$, of the dedicated reference signal; and determining 13 a beam-forming gain parameter, $G_{BF}$, based on the measured received power, $P_{RSRP}$, of the cell-specific reference signal and on the measured received power, $P_{DRSRP}$, of the dedicated reference signal. The invention also relates to user equipment, methods in base station, base station, computer programs and computer program products.

14 Claims, 5 Drawing Sheets

(56) References Cited

U.S. PATENT DOCUMENTS

2011/0149886 A1* 6/2011 Xu .................. H04B 7/0628
 370/329
2011/0280333 A1 11/2011 Yang et al.
2012/0176982 A1* 7/2012 Zirwas et al. ................. 370/329

OTHER PUBLICATIONS

Office Action in EP application No. 11879146.6 mailed Oct. 17, 2014.

* cited by examiner

METHODS FOR DETERMINING A BEAM-FORMING GAIN PARAMETER, USER EQUIPMENT, BASE STATION, COMPUTER PROGRAMS AND COMPUTER PROGRAM PRODUCTS

TECHNICAL FIELD

The technology disclosed herein relates generally to the field of wireless communication systems, and in particular to beam-forming within such wireless communication systems.

BACKGROUND

Smart antennas are widely utilized in wireless communication systems. In contrast to a traditional antenna, which has a single fixed beam pattern, the smart antenna may dynamically generate multiple beam patterns. Each such beam pattern can be pointed towards a particular user equipment and the beam patterns may be adapted to follow the particular user equipment as he moves. The smart antenna technologies may greatly increase the signal gain of the targeted user equipment and reduce the interference to other user equipment using the same channel.

Beam-forming is a key feature in communication systems today, and an operator thereof may enable and disable the beam-forming feature for particular cells or carrier frequencies. It can however be difficult to optimize the use of the beam-forming feature so as to provide the best possible performance for as many users as possible. For example, the use of beam-forming for user equipment moving at high speed suffers from limited tracking speed. The use of beam-forming for user equipment being "out-of-sight" from a base station suffers from the limited speed of beam-forming and it is thus difficult to decide whether or not to use beam-forming in e.g. urban areas. For these users the beam-forming gain is much lower than expected and if used, increases the interference towards other user equipment.

Manual drive tests may be performed, wherein a car is driven around to collect user equipment measurements in a cell of the communication system. However, although such manual test drives provide a more accurate basis for the decision on whether or not to use the beam-forming feature they are time-consuming as well as expensive and still only provides a limited picture of the user performance.

SUMMARY

An object of the invention is to address and alleviate at least some of the above mentioned problems. In particular, it is an object of the invention to provide methods and arrangements for improving beam-forming use.

The object is according to a first aspect obtained by a method in a user equipment of a communication system for determining a beam-forming gain parameter, the communication system comprising a base station serving the user equipment. The method comprises: receiving a cell-specific reference signal and a dedicated reference signal from the base station; measuring a received power of the cell-specific reference signal and a received power of the dedicated reference signal; and determining a beam-forming gain parameter based on the measured received power of the cell-specific reference signal and on the measured received power of the dedicated reference signal.

In contrast to prior art, wherein the beam-forming feature is enabled or disabled for a particular cell or a particular carrier frequency, the present invention provides methods and devices for enabling and disabling the beam-forming feature for particular user equipment.

By means of the method, costs associated with drive tests can be reduced. The method provides a more adaptive beam-forming function and may thereby improve the efficiency of beam-forming and communication system performance. Aspects of the invention may also conveniently be implemented in existing user equipment devices and radio access networks. Further still, aspects of the invention may also be adopted in standards such as 3GPP.

The object is according to a second aspect achieved by a user equipment of a communication system comprising a base station serving the user equipment. The user equipment comprises a receiver adapted to receive a cell-specific reference signal and a dedicated reference signal from the base station. The user equipment further comprises a processing unit adapted to: measure a received power of the cell-specific reference signal and a received power of the dedicated reference signal, and determine a beam-forming gain parameter based on the measured received power of the cell-specific reference signal and on the measured received power of the dedicated reference signal.

The object is according to a third aspect achieved by a computer program for a user equipment of a communication system comprising a base station serving the user equipment. The computer program comprises computer program code which when run in the user equipment causes the user equipment to: receive a cell-specific reference signal and a dedicated reference signal from the base station; measure a received power of the cell-specific reference signal and a received power of the dedicated reference signal, and determine a beam-forming gain parameter based on the measured received power of the cell-specific reference signal and on the measured received power of the dedicated reference signal.

The object is according to a fourth aspect achieved by a computer program product comprising a computer program as above, and computer readable means on which the computer program is stored.

The object is according to a fifth aspect achieved by a method performed in a base station of a communication system, the base station serving one or more user equipment. The method comprises: obtaining a beam-forming gain parameter related to one of the user equipment and determining based on the obtained beam-forming gain parameter whether beam-forming is to be used for the user equipment.

The object is according to a sixth aspect achieved by a base station of a communication system, the base station serving one or more user equipment. The base station comprises: a processing unit adapted to obtain a beam-forming gain parameter related to one of the user equipment and to determine based on the obtained beam-forming gain parameter whether beam-forming is to be used for the user equipment.

The object is according to a seventh aspect achieved by a computer program for a base station of a communication system, the base station serving one or more user equipment. The computer program comprises computer program code which when run in the base station causes the base station to: obtain a beam-forming gain parameter related to one of the user equipment and determine based on the obtained beam-forming gain parameter whether beam-forming is to be used for the user equipment.

The object is according to an eight aspect achieved by a computer program product comprising a computer program as above, and computer readable means on which the computer program is stored.

Further features and advantages of the invention will become clear upon reading the following description and the accompanying drawings.

DETAILED DESCRIPTION OF EMBODIMENTS

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

As mentioned in the background section, beam-forming gain may be verified in manual driver tests, and also in lab tests. Briefly, in contrast to this prior art, in various aspects of the invention a user equipment measurement of beam-forming is introduced.

Figure 1:
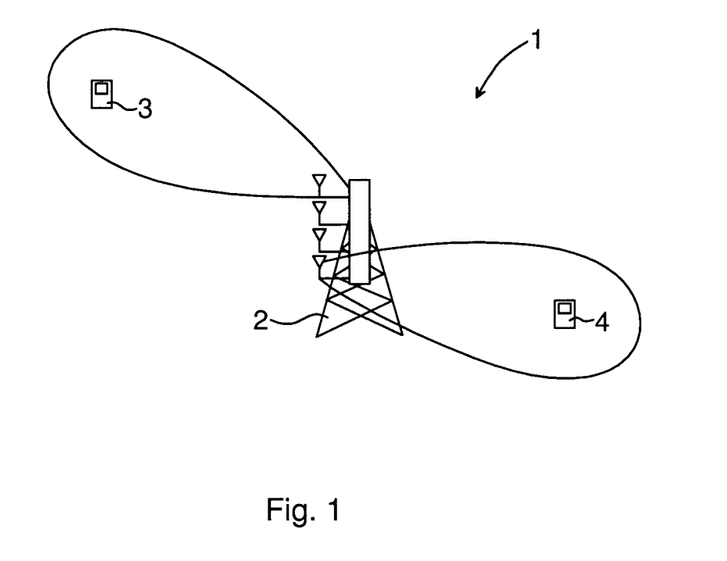
FIG. 1 illustrates schematically an environment in which embodiments of the invention may be implemented.

FIG. 1 illustrates schematically an environment in which embodiments of the invention may be implemented. The communication system 1 comprises a base station 2, e.g. an eNodeB (also denoted eNB and evolved node B) of an LTE conforming communication system. The base station 2 comprises a receiver 41 and a transmitter 40 (refer also to FIG. 11), both in turn is connected to physical antennas. By means of the receiver, transmitter and physical antennas the base station 2 receives signaling from user equipment 3, 4 and transmits signaling to the user equipment 3, 4, and the base station 2 thus serves the user equipment 3, 4 located within its coverage area (which could comprise one or more cells).

Cell-specific reference signals are often referred as 'common' reference signals (CRS), and they are available to all user equipment 3, 4 in a cell. The cell-specific reference signals are mainly used for channel estimation, channel quality detection, and cell search. The mapping of downlink reference signals is defined in the 3GPP specification (refer to 3GPP TS 36.211 V10.1.0, Evolved Universal Terrestrial Radio Access (E-UTRA); Physical channels and modulation).

Figure 2:
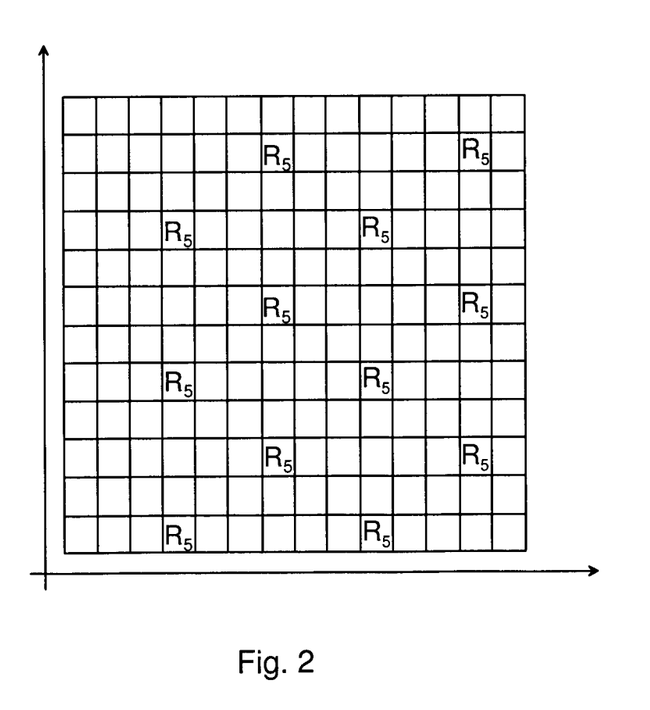
FIG. 2 illustrates mapping of dedicated reference signals.
Figure 3:
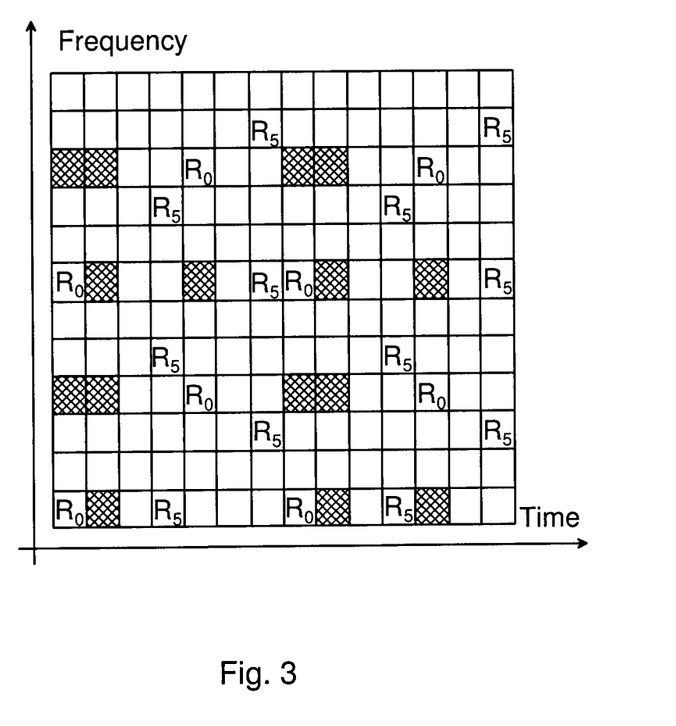
FIG. 3 illustrates mapping of cell specific reference signals and dedicated reference signals.

FIG. 2 illustrates mapping of dedicated reference signals and FIG. 3 illustrates mapping of cell specific reference signals and dedicated reference signals. Dedicated reference signals (DRSs), also denoted user specific reference signals, may be transmitted in addition to the cell-specific reference signals described above. They are embedded only in the resource blocks to which the physical downlink shared channel (PDSCH) is mapped for user equipment which are specifically configured by higher-layer Radio Resource Control (RRC) signaling to receive their downlink data transmissions in this mode.

The user specific reference signals may be used to enable beam-forming of the data transmissions to specific user equipment. For example, rather than using the physical antennas used for transmission of other (cell-specific) antenna ports, the base station 2 may use a correlated array of physical antenna elements to generate a narrow beam in the direction of a particular user equipment. Such a beam will experience a different channel response between the base station 2 and the user equipment 3, 4, thus requiring the use of user specific reference signals to enable the user equipment to demodulate the beam-formed data coherently.

Reference signal received power (RSRP) is defined as the linear average of the resource elements that carry cell-specific reference signals within the considered measurement frequency bandwidth.

In this invention, DRSRP (Dedicated RSRP) is defined as the linear average of the resource elements that carry user equipment-specific reference signals within the considered measurement frequency bandwidth and only on the resource blocks upon which the corresponding PDSCH is mapped.

As general implement, cell-specific reference signals use broadcast weight factor and user equipment-specific reference signals uses beam-forming weigh factor as the corresponding PDSCH.

$P_B$ is a cell-specific parameter signaled by higher layers; $P_A$ is a user equipment specific parameter provided by higher layers. $\rho$ ($\rho_A$ or $\rho_B$) denotes the ratio of PDSCH Energy Per Resource Element (EPRE) to cell-specific reference signal EPRE among PDSCH resource elements (REs) (not applicable to PDSCH REs with zero EPRE) for each Orthogonal Frequency Division Multiplexing (OFDM) symbol. $\rho$ can be calculated from $P_A$ and $P_B$.

Assuming, $P_{RSRP}$: RSRP measurement result; unit dBm;

$P_{DRSRP}$: DRSRP measurement result; unit dBm;

$\rho'$: the ratio of PDSCH EPRE to UE-specific RS EPRE, constant.

PDSCH received power (per RE) can be calculated:

$$P_{PDSCH\_RE} = P_{RSRP} + 10\lg(\rho), dBm$$

User equipment-specific reference signal received power without beam-forming can be estimated:

$$P'_{DRSRP} = P_{PDSCH\_RE} - 10\lg(\rho') = P_{RSRP} + 10\lg(\rho) - 10\lg(\rho'), dBm.$$

Hence, beam-forming gain $G_{BF}$ can be obtained:

$$G_{BF} = P_{DRSRP} - P'_{DRSR}$$
$$= P_{DRSRP} - [PRSRP + 10\lg(\rho) - 10\lg(\rho')]$$
$$= P_{DRSRP} - P_{RSRP} + 10\lg(\rho'/\rho), dB$$

The beam-forming gain of PDSCH is the same as that of dedicated reference signals, $G_{BF}$.

Figure 4:
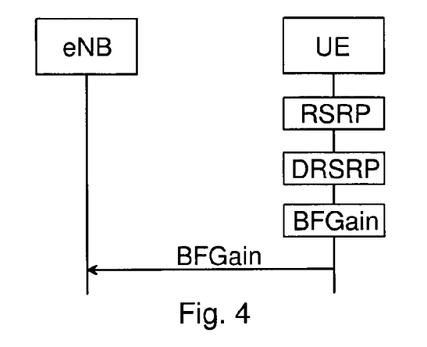
FIG. 4 is a sequence diagram illustrating an aspect of the invention.

FIG. 4 is a sequence diagram illustrating an aspect of the invention. The base station 2, is exemplified by an eNB, and receives signals from the user equipment 3, 4. In particular, the base station 2 receives RSRP and DRSRP measurements from the user equipment 2, and is thereby able to determine the beam-forming gain $G_{BF}$, the details of which will be described later. Based on the beam-forming gain $G_{BF}$ the base station 2 then turns off or on the beam-forming function for the user equipment, which is also described more in detail later. The user equipment 3, 4 may report these measurement reports periodically, with a reporting period defined in the measurement control. The periodical report can be ordered by the system for adaptive beam-forming switching, and also by operation and maintenance systems to analyze the beam-forming performance.

Figure 5:
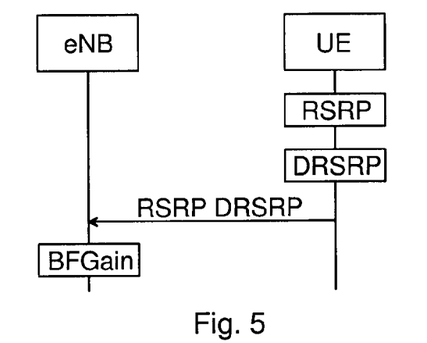
FIG. 5 is a sequence diagram illustrating another aspect of the invention.

FIG. 5 is a sequence diagram illustrating another aspect of the invention. The base station 2, again exemplified by an eNB, receives signals from the user equipment 3, 4. In particular, the base station 2 receives the beam-forming gain $G_{BF}$ from the user equipment 3, 4, as calculated by the user equipment based on RSRP and DRSRP measurements. The user equipment 3, 4 may report the beam-forming gain $G_{BF}$ periodically, or the reporting can be event-triggered. For example, in an event-triggered reporting, the measurement is transmitted only when beam-forming gain is below a certain beam-forming gain threshold value. It is noted that periodical reporting and event-triggered reporting may also be used simultaneously.

The invention provides in various aspects, a beam-forming switching based on user equipment, and not per cell or carrier frequency as in the prior art. In the prior art, the beam-forming switching is a static configuration in the Radio Access Network (RAN) system and Operation and Maintenance system, and switched, as mentioned per cell or carrier frequency.

In particular, an automatic mechanism of beam-forming switch is introduced:

(1) Global beam-forming switch based on cell or carrier;

(2) If Global beam-forming switch is activated, the base station, e.g. eN, evaluates the user equipment's beam-forming performance and stability, e.g. using angle of arrival (AOA) measurement and beam-forming measurement.

(3) If the measured user equipment does not satisfy the beam-forming requirement(s), the base station turns off the beam-forming switch for the user equipment with broadcast weigh factor for the downlink beam-forming.

(4) If the user equipment not using beam-forming does satisfy the beam-forming requirement again, the base station turns on the beam-forming switch for the user equipment.

Figure 6:
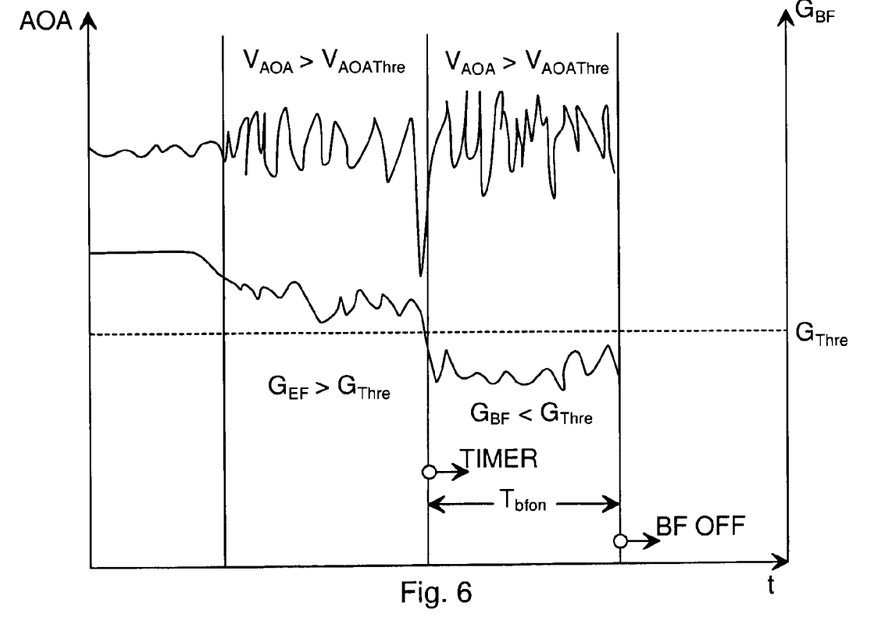
FIG. 6 illustrates an exemplary case for turning off beam-forming for a user equipment.

FIG. 6 illustrates an exemplary case for turning off beam-forming for a user equipment. Criteria for turning off beam-forming are described more in detail later. The AOA and BF gain $G_{BF}$ are illustrated in the figure, AOA in the upper graph and BF gain in the lower graph, with time on the x-axis. Three criteria are shown: Variance of AOA $V_{AOA} > V_{AOA\ Threshold}$, $G_{BF} < G_{Thres}$ and $T_{bfoff}$. The beam-forming gain threshold $G_{Thres}$ is illustrated at the dotted horizontal line. First, the $V_{AOA} > V_{AOA\ Threshold}$ is fulfilled, but $G_{BF} > G_{Thres}$ and no action is taken (i.e. the user equipment continues using beam-forming). Then $V_{AOA} > V_{AOA\ Threshold}$ and $G_{BF} < G_{Thres}$, and a timer is started. When the timer has run for a set time period $T_{bfoff}$, while the criteria $V_{AOA} > V_{AOA\ Threshold}$ and $G_{BF} < G_{Thres}$ are still fulfilled, then the beam-forming is turned off for the user equipment.

Figure 7:
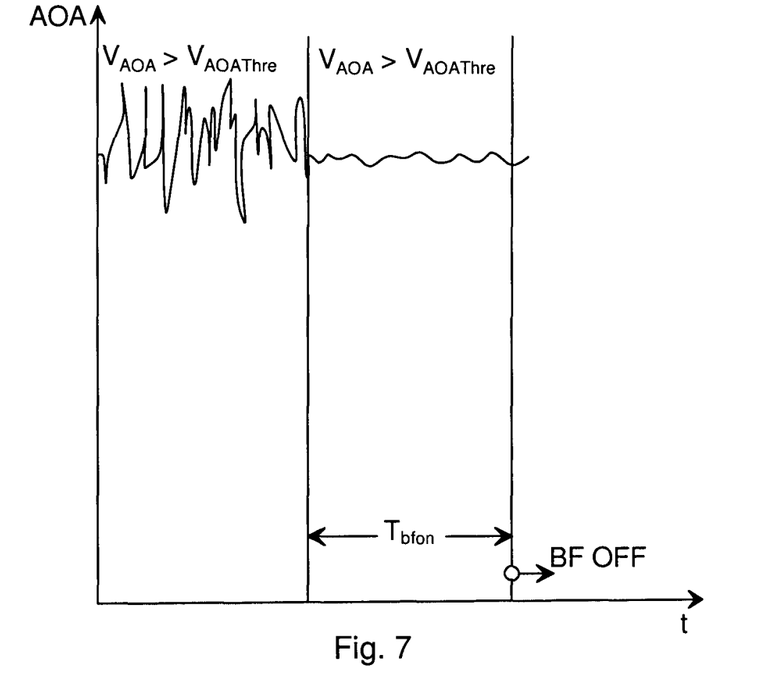
FIG. 7 illustrates an exemplary case for turning on beam-forming for a user equipment.

FIG. 7 illustrates an exemplary case for turning on beam-forming for a user equipment. Criteria for turning on the beam-forming are described more in detail later. The AOA is illustrated at the y-axis versus time on the x-axis. As long as $V_{AOA} > V_{AOA\ Threshold}$ no action is taken (i.e. the user equipment does not use beam-forming). When $V_{AOA} < V_{AOA\ Threshold}$ is fulfilled, a timer is started. When the timer has run for a set time period $T_{bfon}$, while the criterion $V_{AOA} < V_{AOA\ Threshold}$ is still fulfilled, then the beam-forming is turned on for the user equipment.

Figure 8:
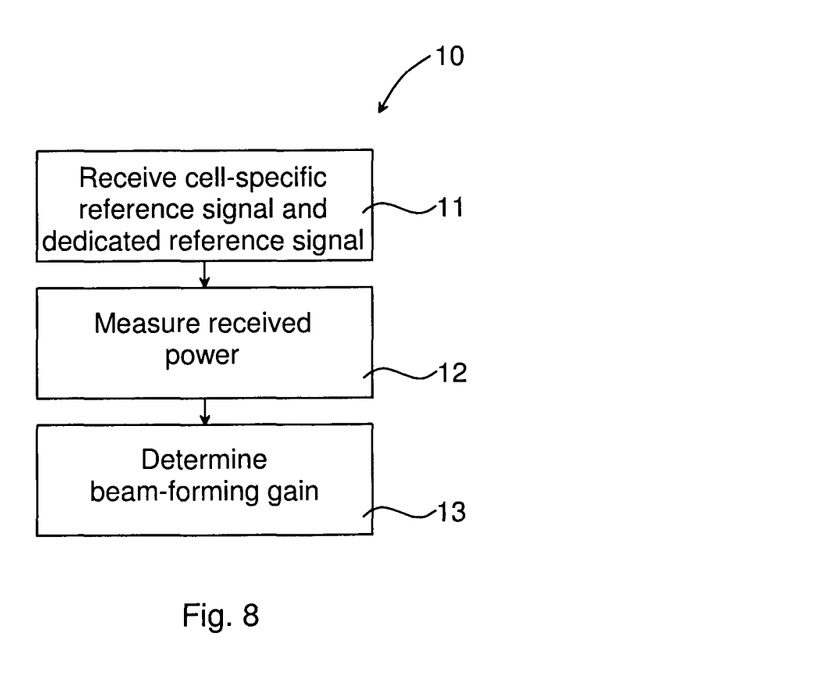
FIG. 8 is a flowchart over steps of a method in a user equipment.

FIG. 8 is a flowchart over steps of a method 10 in a user equipment. The method 10 is performed in a user equipment 3, 4 of a communication system 1 comprising a base station 2 serving the user equipment 3, 4. The method 10 comprises receiving 11 a cell-specific reference signal and a dedicated reference signal from the base station 2.

The method 10 further comprises measuring 12 a received power $P_{RSRP}$ of the cell-specific reference signal and a received power $P_{DRSRP}$ of the dedicated reference signal.

The method 10 further comprises determining 13 a beam-forming gain parameter $G_{BF}$ based on the measured received power $P_{RSRP}$ of the cell-specific reference signal and on the measured received power $P_{DRSRP}$ of the dedicated reference signal.

In an embodiment, the method 10 comprises transmitting the measured received power $P_{DRSRP}$ of the dedicated reference signal, the measured received power $P_{RSRP}$ of the cell-specific reference signal and/or the determined beam-forming gain parameter $G_{BF}$ to the base station 2. The base station 2 is thus enabled to determine whether or not to use the beam-forming feature for this particular user equipment 3, 4.

In an embodiment, the determining of the beam-forming gain parameter $G_{BF}$ comprises calculating the beam-forming gain parameter $G_{BF}$ by: $G_{BF} = P_{DRSRP} - P'_{DRSRP}$, wherein $P_{DRSRP}$ is the measured received power of the dedicated reference signal and $P'_{DRSRP}$ is an estimation of received power of a dedicated reference signal when transmitted without use of beam-forming.

In the above embodiment, the estimation of received power $P'_{DRSRP}$ of a dedicated reference signal transmitted without use of beam-forming is estimated by: $P'_{DRSRP} = P_{RSRP} + 10 \lg(\rho) - 10 \lg(\rho')$, wherein $P_{RSRP}$ is the received power of the cell-specific reference signals, $\rho$ is the ratio of energy per resource elements of a physical downlink shared channel and energy per resource element of the dedicated reference signal, and $\rho'$ is the ratio of energy per resource element for a physical downlink shared channel and the energy per resource element of the dedicated reference signal.

In an embodiment, the method 10 comprises transmitting the determined beam-forming gain parameter $G_{BF}$ to the base station 2 when the beam-forming gain parameter $G_{BF}$ is below a predetermined threshold value $G_{Thres}$. The threshold value $G_{Thres}$ may be determined e.g. based on simulations.

In an embodiment, the received power $P_{DRSRP}$ of the dedicated reference signal comprises the linear average of resource elements carrying the dedicated reference signal within a predetermined measurement frequency bandwidth or the linear average of resource elements carrying the dedicated reference signal within a predetermined measurement frequency bandwidth for resource blocks upon which a corresponding physical downlink shared channel, PDSCH, is mapped.

Figure 9:
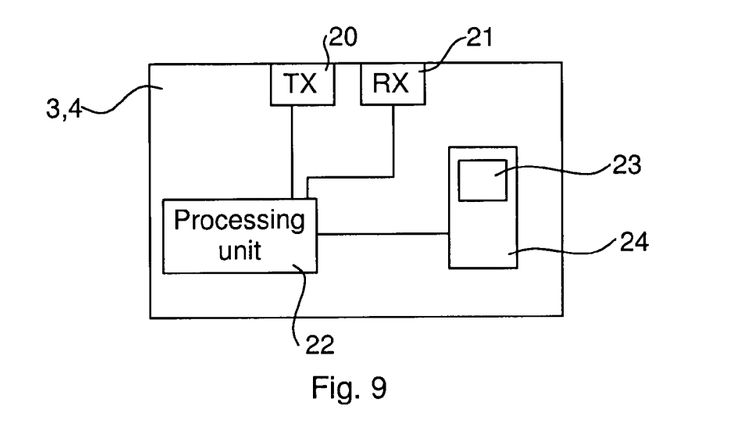
FIG. 9 illustrates an exemplifying user equipment comprising means for implementing embodiments of the methods.

FIG. 9 illustrates an exemplifying user equipment 3, 4 comprising means for implementing embodiments of the methods. The user equipment 3, 4 comprises a receiver 20 adapted to, e.g. configured to, receive cell-specific reference signals and dedicated reference signals from the base station 2.

The user equipment 3, 4 further comprises a processing unit 22 adapted to, e.g. configured to, measure a received power $P_{RSRP}$ of the cell-specific reference signal and a received power $P_{DRSRP}$ of the dedicated reference signal, and to determine a beam-forming gain parameter $G_{BF}$ based on the measured received power $P_{RSRP}$ of the cell-specific reference signal and on the measured received power $P_{DRSRP}$ of the dedicated reference signal. The processing unit 22 may be a central processing unit, microcontroller, digital signal processor (DSP), etc., capable of executing software instructions stored in a computer program product 24 e.g. in the form of a memory. The processing unit 22 is connected to the receiver 20 that receives inputs from user equipment 3, 4. It is noted that although only one processing unit 22 is illustrated in FIG. 9, the implementation may comprise distributed hardware so that several CPUs are used rather than one when running the software.

The described methods and algorithms or parts thereof for use in determining whether or not to use beam-forming for a user equipment may be implemented e.g. by software and/or application specific integrated circuits in the processing unit 22. To this end, the user equipment 3, 4 may further comprise the computer program 24 stored on a computer program product 23.

With reference still to FIG. 9, the invention thus also encompasses the computer program 23 for a user equipment 3, 4 as described. The computer program 23 comprises computer program code which when run on the user equipment 3, 4, and in particular the processing unit 22 thereof, causes the user equipment 3, 4 to perform the methods as described.

In particular, the computer program 23 is used for the user equipment 3, 4 of the communication system 1, wherein the base station 2 serves one or more user equipment 3, 4. The computer program 23 comprises computer program code which when run in the user equipment 3, 4 causes the user equipment 3, 4: to receive a cell-specific reference signal and a dedicated reference signal from the base station 2; to measure a received power $P_{RSRP}$ of the cell-specific reference signal and a received power $P_{DRSRP}$ of the dedicated reference signal; and to determine a beam-forming gain parameter $G_{BF}$ based on the measured received power $P_{RSRP}$ of the cell-specific reference signal and on the measured received power $P_{DRSRP}$ of the dedicated reference signal.

A computer program product 24 is also provided comprising the computer program 23 and computer readable means on which the computer program 23 is stored. The computer program product 24 may be any combination of read and write memory (RAM) or read only memory (ROM). The computer program product 24 may also comprise persistent storage, which, for example can be any single one or combination of magnetic memory, optical memory, or solid state memory.

Figure 10:
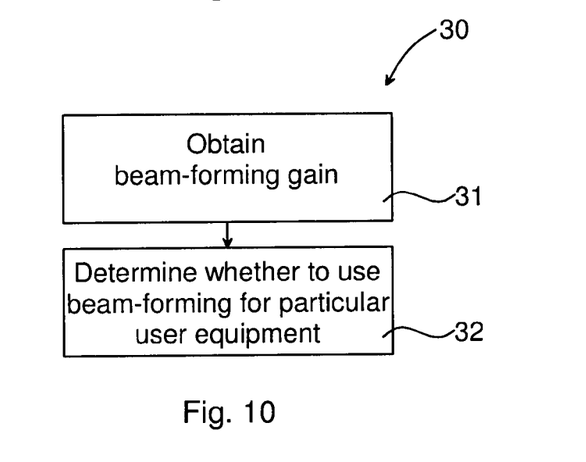
FIG. 10 is a flowchart over steps of a method in a base station.

FIG. 10 is a flowchart over steps of a method 30 in a base station 2. The method 30 is performed in the base station 2 of a communication system 1, the base station 2 serving one or more user equipment 3, 4. The method 30 comprises obtaining 31 a beam-forming gain parameter $G_{BF}$ related to one of the user equipment 3, 4 and determining 32 based on the obtained beam-forming gain parameter $G_{BF}$ whether beam-forming is to be used for the user equipment 3, 4.

In an embodiment (compare also FIGS. 4 and 5), the obtaining 31 of the beam-forming gain parameter $G_{BF}$ comprises receiving the beam-forming gain parameter $G_{BF}$ in a signal from the user equipment 3, 4.

In another embodiment (compare also FIGS. 4 and 5), the obtaining 31 of the beam-forming gain parameter $G_{BF}$ comprises transmitting a cell-specific reference signal and a dedicated reference signal; receiving from the user equipment 3, 4 a measured received power $P_{RSRP}$ of the cell-specific reference signal and a measured received power $P_{DRSRP}$ of the dedicated reference signal, and determining the beam-forming gain parameter $G_{BF}$ based on the measured received power $P_{DRSRP}$ of the dedicated reference signal and on the measured received power $P_{DRSRP}$ of the dedicated reference signal.

The base station may thus either simply receive the beam-forming gain parameter $G_{BF}$ for a user equipment 3, 4 from the user equipment 3, 4 and determine if the beam-forming feature should be turned-off or turned on for this user equipment 3, 4, or it may determine, e.g. calculate, the beam-forming gain parameter $G_{BF}$ for a user equipment 3, 4 based on measurements received from the user equipment 3, 4.

The method 30 may, in the embodiment wherein the base station 2 itself determines the beam-forming gain parameter, comprise determining the beam-forming gain parameter $G_{BF}$ by calculating the beam-forming gain parameter, $G_{BF}$, by:

$$G_{BF} = P_{DRSRP} - P'_{DRSRP},$$

wherein $P_{DRSRP}$ is the measured received power of the dedicated reference signal and $P'_{DRSRP}$ is an estimation of received power of a dedicated reference signal transmitted without use of beam-forming.

In an embodiment, the determining 32 of whether the beam-forming is to be used for the user equipment 3, 4 comprises:
 comparing the beam-forming gain parameter $G_{BF}$ with a predetermined threshold value $G_{Thres}$;
 calculating a variance of angle of arrival $V_{AOA}$ of a number of signals received from the user equipment 3, 4;
 comparing the calculated variance of angle of arrival $V_{AOA}$ with a predetermined threshold value $V_{AOA, Thres}$, and
 turning off the beam-forming for the user equipment 3, 4 if the beam-forming gain parameter $G_{BF}$ is below the predetermined threshold value $G_{Thres}$, if the calculated variance of angle of arrival $V_{AOA}$ is above the predetermined threshold value $V_{AOA, Thres}$ and if a set turn-off time period $T_{boff}$ has elapsed. The beam-forming is thus turned off if: $(V_{AOA} > V_{AOAThre})$ and $(G_{BF} < G_{Thre})$ and $T_{bfoff}$ (refer also to FIGS. 6 and 7).

The variance of AOA measurement VAOA may be calculated in accordance with the following formula:

$$V_{AOA} = 1/N^*[(A_1-\overline{A})^2 + (A_2-\overline{A})^2 + \ldots + (A_N-\overline{A})^2]$$

, where A1, A2, ..., AN are the continuous AOA measurements, $\overline{A}$ is the average of the continuous AOA measurements, and $\overline{A} = 1/N^*(A_1 + A_2 + \ldots + A_N)$.

The turn-off time period $T_{bfoff}$ may be implemented as a timer set to $T_{bfon}$. The time period is chosen so that the beam-forming is not turned off immediately upon detection of such need. For example, the beam-forming should not be turned off immediately if gain is above or below certain levels, but only if the gain continues to be above or below these levels for the entire time period $T_{bfoff}$.

It is noted that the different criterion for when to turn off the beam-forming for a user equipment may be determined in any order, not only the above exemplifying order. For example, the variance of angle of arrival of a number of signals may first be compared to a predetermined threshold value.

In an embodiment, the method 30 comprises turning on the beam-forming when: a variance of an angle of arrival $V_{AOA}$ of a number of signals received from the user equipment 3, 4 is below a predetermined threshold value $V_{AOA, Thres}$ and when a set turn-on time period $T_{bon}$ has elapsed.

In other embodiments only one or two criteria are used for determining whether or not beam-forming is to be used for a particular user equipment 3, 4, i.e. whether or not to turn the beam-forming feature on or off for the user equipment 3, 4.

In particular, the beam-forming gain parameter, $G_{BF}$, may be compared with a predetermined threshold value $G_{Thres}$, and the beam-forming for the user equipment 3, 4 may be turned off if the beam-forming gain parameter, $G_{BF}$, is below the predetermined threshold value $G_{Thres}$.

In addition to this criterion, or as a separate criteria, the variance of angle of arrival $V_{AOA}$ of a number of signals received from the user equipment 3, 4 may be calculated and compared with a predetermined threshold value $V_{AOA, Thres}$, upon which the beam-forming for the user equipment 3, 4 is turned off if the calculated variance of angle of arrival $V_{AOA}$ is above the predetermined threshold value $V_{AOA, Thres}$.

Further, the criterion of the beam-forming gain parameter, $G_{BF}$, being below a predetermined threshold value $G_{Thres}$ may also be used to determine the need to turn off the beam-forming feature.

Thus, all the above exemplified criteria may be used separately or in any combination for determining whether or not to turn off the beam-forming feature for a particular user equipment 3, 4.

Figure 11:
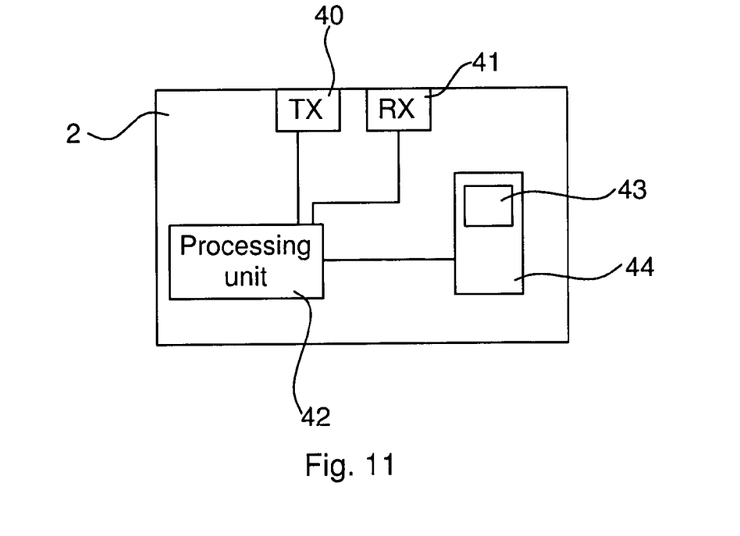
FIG. 11 illustrates an exemplifying base station comprising means for implementing embodiments of the methods.

FIG. 11 illustrates an exemplifying base station 2 comprising means for implementing embodiments of the methods. The base station 2 is part of a communication system 1, such as described with reference to FIG. 1, and serves one or more user equipment 3, 4.

The base station 2 comprises a processing unit 42 adapted to obtain a beam-forming gain parameter related to one of the user equipment 3, 4.

The processing unit 42 is further adapted to determine based on the obtained beam-forming gain parameter $G_{BF}$ whether beam-forming is to be used for the user equipment 3, 4. The processing unit 42 may be a central processing unit, microcontroller, digital signal processor (DSP), etc., capable of executing software instructions stored in a computer program product 43 e.g. in the form of a memory. The processing unit 42 is connected to the receiver 41 that receives inputs from user equipment 3, 4. It is noted that although only one processing unit 42 is illustrated in FIG. 11, the implementation may comprise distributed hardware so that several CPUs are used rather than one when running the software.

The described methods and algorithms or parts thereof for use in determining whether or not to use beam-forming for a user equipment may be implemented e.g. by software and/or application specific integrated circuits in the processing unit 42. To this end, the base station 2 may further comprise the computer program 43 stored on a computer program product 44.

With reference still to FIG. 11, the invention thus also encompasses the computer program 43 for a base station 2 as described. The computer program 43 comprises computer program code which when run on the base station 2, and in particular the processing unit 42 thereof, causes the base station 2 to perform the methods as described. In particular, the computer program 43 is used for the base station 2 of the communication system 1, wherein the base station 2 serves one or more user equipment 3, 4. The computer program 43 comprises computer program code which when run in the base station 2 causes the base station 2 to obtain a beam-forming gain parameter $G_{BF}$ related to one of the user equipment 3, 4, and to determine based on the obtained beam-forming gain parameter $G_{BF}$ whether beam-forming is to be used for the user equipment 3, 4.

A computer program product 44 is also provided comprising the computer program 43 and computer readable means on which the computer program 43 is stored. The computer program product 44 may be any combination of read and write memory (RAM) or read only memory (ROM). The computer program product 44 may also comprise persistent storage, which, for example can be any single one or combination of magnetic memory, optical memory, or solid state memory.

The invention claimed is:

1. A method performed in a user equipment for determining a beam-forming gain parameter, said user equipment configured for operation in a communication system comprising a base station serving the user equipment, the method comprising:
   receiving a cell-specific reference signal and a dedicated reference signal from the base station,
   measuring a received power, $P_{RSRP}$, of the cell-specific reference signal and a received power, $P_{DRSRP}$, of the dedicated reference signal,
   determining a beam-forming gain parameter, $G_{BF}$, based on the measured received power, $P_{RSRP}$, of the cell-specific reference signal and on the measured received power, $P_{DRSRP}$, of the dedicated reference signal, and
   transmitting the determined beam-forming gain parameter, $G_{BF}$, to the base station when the beam-forming gain parameter, $G_{BF}$, is below a predetermined threshold value, $G_{Thres}$.

2. The method of claim 1, further comprising transmitting to the base station at least one of:
   the measured received power, $P_{DRSRP}$, of the dedicated reference signal;
   the measured received power, $P_{RSRP}$, of the cell-specific reference signal; and
   the determined beam-forming gain parameter, $G_{BF}$.

3. The method of claim 1, wherein the determining of the beam-forming gain parameter, $G_{BF}$, comprises calculating the beam-forming gain parameter, $G_{BF}$, by:

$$G_{BF} = P_{DRSRP} - P'_{DRSRP},$$

wherein $P_{DRSRP}$ is the measured received power of the dedicated reference signal and $P'_{DRSRP}$ is an estimation of received power of a dedicated reference signal when transmitted without use of beam-forming.

4. The method of claim 3, wherein the estimation of received power, $P'_{DRSRP}$, of a dedicated reference signal transmitted without use of beam-forming is estimated by:

$$P'_{DRSRP} = P_{RSRP} + 10 \lg(\rho) - 10 \lg(\rho'),$$

wherein $P_{RSRP}$ is the received power of the cell-specific reference signals, $\rho$ is the ratio of energy per resource elements of a physical downlink shared channel and energy per resource element of the dedicated reference signal, and $\rho'$ is the ratio of energy per resource element for a physical downlink shared channel and the energy per resource element of the dedicated reference signal.

5. The method of claim 1, wherein the received power, $P_{DRSRP}$, of the dedicated reference signal comprises the linear average of resource elements carrying the dedicated reference signal within a predetermined measurement frequency bandwidth or the linear average of resource elements carrying the dedicated reference signal within a predetermined measurement frequency bandwidth for resource blocks upon which a corresponding physical downlink shared channel, $P_{DSCH}$, is mapped.

6. A user equipment configured for operation in a communication system comprising a base station for serving the user equipment, the user equipment comprising:
   a receiver adapted to receive a cell-specific reference signal and a dedicated reference signal from the base station;
   a processing unit adapted to:

measure a received power, $P_{RSRP}$, of the cell-specific reference signal and a received power, $P_{DRSRP}$, of the dedicated reference signal, and determine a beam-forming gain parameter, $G_{BF}$, based on the measured received power, $P_{RSRP}$, of the cell-specific reference signal and on the measured received power, $P_{DRSRP}$, of the dedicated reference signal; and a transmitter coupled to the processor and adapted to transmit the determined beam-forming gain parameter, $G_{BF}$, to the base station when the beam-forming gain parameter, $G_{BF}$, is below a predetermined threshold value, $G_{Thres}$.

7. A non-transitory computer-readable medium storing a computer program for a user equipment configured for operation in a communication system comprising a base station for serving the user equipment, the computer program comprising computer program code which when executed by a processing circuit in the user equipment causes the user equipment to:

receive a cell-specific reference signal and a dedicated reference signal from the base station, measure a received power, $P_{RSRP}$, of the cell-specific reference signal and a received power, $P_{DRSRP}$, of the dedicated reference signal, determine a beam-forming gain parameter, $G_{BF}$, based on the measured received power, $P_{RSRP}$, of the cell-specific reference signal and on the measured received power, $P_{DRSRP}$, of the dedicated reference signal, and transmit the determined beam-forming gain parameter, $G_{BF}$, to the base station when the beam-forming gain parameter, $G_{BF}$, is below a predetermined threshold value, $G_{Thres}$.

8. A method performed in a base station of a communication system, the base station serving one or more user equipments, the method comprising:

obtaining a beam-forming gain parameter, $G_{SF}$, related to one of the user equipments;

determining based on the obtained beam-forming gain parameter, $G_{BF}$, whether beam-forming is to be used for the user equipment; and turnin on the beam-formin when a variance of an an le of arrival $V_{AOA}$ of a number of signals received from the user equipment is below a predetermined threshold value $V_{AOA,\ Thres}$ and when a set turn-on time period, $T_{bon}$, has elapsed.

9. The method of claim 8, wherein the obtaining of the beam-forming gain parameter, $G_{BF}$, comprises receiving the beam-forming gain parameter, $G_{BF}$, in a signal from the user equipment.

10. The method of claim 8, wherein the obtaining of the beam-forming gain parameter, $G_{BF}$, comprises:

transmitting a cell-specific reference signal and a dedicated reference signal;

receiving from the user equipment a measured received power, $P_{RSRP}$, of the cell-specific reference signal and a measured received power, $P_{DRSRP}$, of the dedicated reference signal; and determining the beam-forming gain parameter, $G_{BF}$, based on the measured received power, $P_{DRSRP}$, of the dedicated reference signal and on the measured received power, $P_{DRSRP}$, of the dedicated reference signal.

11. The method of claim 10, wherein the determining of the beam-forming gain parameter, $G_{BF}$, comprises calculating the beam-forming gain parameter, $G_{BF}$, by:

$$G_{BF} = P_{DRSRP} - P'_{DRSRP},$$

wherein $P_{DRSRP}$ is the measured received power of the dedicated reference signal and $P'_{DRSRP}$ is an estimation of received power of a dedicated reference signal transmitted without use of beamforming.

12. The method of claim 8, wherein determining whether the beam-forming is to be used for the user equipment comprises:

comparing the beam-forming gain parameter, $G_{BF}$, with a predetermined threshold value $G_{Thres}$;

calculating a variance of angle of arrival $V_{AOA}$ of a number of signals received from the user equipment;

comparing the calculated variance of angle of arrival $V_{AOA}$ with a predetermined threshold value $V_{AOA,\ Thres}$;

turning off the beam-forming for the user equipment if the beam-forming gain parameter, $G_{BF}$, is below the predetermined threshold value $G_{Thres}$; if the calculated variance of angle of arrival $V_{AOA}$, is above the predetermined threshold value $V_{AOA,\ Thres}$, and if a set turn-off time period, $T_{boff}$, has elapsed.

13. A base station of a communication system, the base station configured to serve one or more user equipments and comprising a processing unit adapted to:

obtain a beam-forming gain parameter, $G_{BF}$, related to one of the user equipments;

determine based on the obtained beam-forming gain parameter, $G_{BF}$, whether beam-forming is to be used for the user equipment; and turn on the beam-formin when a variance of an angle of arrival $V_{AOA}$ of a number of signals received from the user equipment is below a predetermined threshold value $V_{AOA,Thres}$ and when a set turn-on time period, $T_{bon}$, has elapsed.

14. A non-transitory computer-readable medium storing a computer program for a base station configured to serve one or more user equipments in a communication system, wherein the computer program comprises computer program code which, when executed by a processing circuit of the base station, causes the base station to:

obtain a beam-forming gain parameter, $G_{BF}$, related to one of the user equipment, determine based on the obtained beam-forming gain parameter, $G_{BF}$, whether beam-forming is to be used for the user equipment, and turn on the beam-formin when a variance of an an le of arrival $V_{AOA}$ of a number of signals received from the user equipment is below a predetermined threshold value $V_{AOA,\ Thres}$ and when a set turn-on time period, $T_{bon}$, has elapsed.

* * * * *